Patented Mar. 13, 1945

2,371,473

UNITED STATES PATENT OFFICE 2,371,473

WAX COMPOSITION

Arthur H. Sanford, Roselle, Del., assignor to Hercules Powder Company, Wilmington, Del., a corporation of Delaware No Drawing. Application April 14, 1942,
Serial No. 438,893

14 Claims. (Cl. 106—173)

This invention relates to modified wax compositions and more particularly, it relates to wax compositions in which the wax is modified by a relatively small quantity of a resin.

Waxes intended for impregnation and for coating require modification for applications in which the softness and tendency to smear of the waxes are undesirable. Modification has been achieved by adding to various waxes, natural resins such as rosin, copal resins, dammar gum, and the like, or their esterification products with ethylene glycol or glycerol. However, the resulting compositions have not been entirely satisfactory since the materials added have, in some cases, been incompatible in part with the wax. This incompatibility has led to formation of haziness, formation of small air pockets, and to separation of the components of the mixture in the molten state.

In addition, the resinous modifiers utilized have tended to discolor the compositions and to fail in weathering, especially in the presence of water. It has also been desirable to obtain harder wax compositions with a particular wax than have been possible without encountering difficulties due to stickiness or blocking brought about by excessive quantities of resin. Thus, it has not been possible to attain the desired gloss, hardness, and resistance to scuffing without encountering poor water resistance, tendency to block and other difficulties.

In accordance with this invention wax compositions with the foregoing disadvantages greatly reduced or eliminated altogether are obtained by modifying a waxy substance with a relatively small amount of an ester of pentaerythritol, dipentaerythritol, tripentaerythritol, or tetrapentaerythritol with rosin. The quantity of the waxy substance will be sufficient to retain in the composition the essential properties of waxes, i. e., the ability to be rubbed and polished, the ability to repel water to a greater or lesser degree, and the ability to be melted readily or placed in solution for application. Thus, the waxy substance will constitute at least about 75% of the non-volatile ingredients of the wax composition. The composition may consist of only a waxy substance and the modifier or it may contain additional modifying agents. The composition may be dissolved in a volatile solvent or may be emulsified for particular methods of use. The composition may be in the solid form, in a paste form, or in a liquid form.

Having thus indicated in a general way the nature of this invention, the following examples are given to illustrate more clearly the nature of the improved modified waxy composition. Examples 1–33 illustrate the proportions in parts per hundred of ingredients which were used in preparing different forms of the new modified wax. The compositions were prepared in the following manner.

The designated proportions of wax and rosin pentaerythritol ester were heated together to a temperature of 130° C. At this temperature, they had both completely melted and could be mixed. When the mixing had been completed, the resulting composition was allowed to cool and harden.

|  | Example | | | |
|---|---|---|---|---|
|  | 1 | 2 | 3 | 4 |
| High melting paraffin (M. P. 58.33° C.) | 99 | 97.5 | 95 | 92.5 |
| Pentaerythritol ester of N wood rosin | 1 | 2.5 | 5 | 7.5 |

|  | Example | | | |
|---|---|---|---|---|
|  | 5 | 6 | 7 | 8 |
| High melting paraffin (M. P. 58.33° C.) | 97.5 | 95 | 92.5 | 90 |
| Dipentaerythritol ester of N wood rosin | 2.5 | 5 | 7.5 | 10 |

|  | Example | | |
|---|---|---|---|
|  | 9 | 10 | 11 |
| Ozokerite | 97.5 | 95 | 92.5 |
| Pentaerythritol ester of N wood rosin | 2.5 | 5 | 7.5 |

|  | Example | | | |
|---|---|---|---|---|
|  | 12 | 13 | 14 | 15 |
| Carnauba wax | 99 | 95 | 92.5 | 75 |
| Pentaerythritol ester of N wood rosin | 1 | 5 | 7.5 | 25 |

|  | Example | | |
|---|---|---|---|
|  | 16 | 17 | 18 |
| Candelilla wax | 97.5 | 95 | 92.5 |
| Pentaerythritol ester of gum rosin | 2.5 | 5 | 7.5 |

|  | Example | | |
|---|---|---|---|
|  | 19 | 20 | 21 |
| Japan wax | 99 | 97.5 | 92.5 |
| Pentaerythritol ester of N wood rosin | 1 | 2.5 | 7.5 |

|  | Example | | |
|---|---|---|---|
|  | 22 | 23 | 24 |
| Beeswax (bleached at 60–65° C.) | 95 | 92.5 | 90 |
| Pentaerythritol ester of N wood rosin | 5 | 7.5 | 10 |

|  | Example | | |
|---|---|---|---|
|  | 25 | 26 | 27 |
| High melting paraffin (M. P. 58.33° C.) | 49.5 | 48.75 | 45.0 |
| Carnauba wax | 49.5 | 48.75 | 45.0 |
| Pentaerythritol ester of N wood rosin | 1 | 2.5 | 10 |

*Example 28*

| Pentaerythritol stearate (M. P. 60° C.) | 90 |
|---|---|
| Pentaerythritol ester of N wood rosin | 10 |

*Example 29*

| Hydrogenated castor oil | 90 |
|---|---|
| Pentaerythritol ester of N wood rosin | 10 |

The products produced in Examples 1–29 were all found to be highly suited for use as coating and impregnating materials. They all possessed a high degree of hardness. They were free of any haziness even when in the molten state. When solidified there was no observable tendency to form air pockets, nor did the particles floc together to form lumps. The excellent nature of the products produced is attributable to the fact that the rosin esters are compatible with the wax in any proportions.

The following examples illustrate additional compositions which were produced in a manner similar to that used in producing the compositions in Examples 1–29. In addition to the ingredients employed in Examples 1–29, small amounts of a cellulose ether were added in amounts indicated in Examples 30–33. The cellulose ether was added to the ingredients while the temperature of the mixture was held at 130° C.

*Example 30*

| High melting paraffin (M. P. 58.33° C.) | 20 |
|---|---|
| Carnauba wax | 55 |
| Pentaerythritol ester of gum rosin | 20 |
| Benzyl cellulose | 5 |

*Example 31*

| High melting paraffin (M. P. 58.33° C.) | 50 |
|---|---|
| Stearic acid | 30 |
| Pentaerythritol ester of purified rosin crystals | 15 |
| Benzyl cellulose | 5 |

*Example 32*

| Pentaerythritol stearate | 80 |
|---|---|
| Pentaerythritol ester of gum rosin | 15 |
| Ethyl cellulose | 5 |

*Example 33*

| High melting paraffin (M. P. 58.33° C.) | 35 |
|---|---|
| Carnauba wax | 40 |
| Butyl phthalyl butyl glycolate | 5 |
| Pentaerythritol ester of N wood rosin | 15 |
| Ethyl cellulose | 5 |

Compositions produced as indicated in Examples 30–33 were also found highly adapted for use as a coating or impregnating material. The presence of the pentaerythritol ester of rosin made it possible to modify the wax to a degree of hardness which would not have been possible were the cellulose ether alone added. To attain this degree of hardness without the pentaerythritol ester of rosin would require the addition of the ether to an extent which would cause the wax to become excessively viscous.

The new improved coating material can also be prepared in the form of solutions or emulsions. These solutions and emulsions may be either liquid or in paste form. They may be prepared as indicated in Examples 34–37.

*Example 34*

A batch of the new coating material of wax modified with a pentaerythritol ester was prepared in the form of a liquid solution in the following manner.

Six parts of carnauba wax, 4 parts of montan wax, and 2 parts of pentaerythritol ester of N wood rosin were melted together at a temperature of 130° C. While the temperature was still held at this figure, 4 parts of paraffin were added. The mixture was then cut with 160 parts of benzene and 24 parts of turpentine. The composition thus obtained was excellent for coating, polishing, and impregnating purposes.

*Example 35*

A solution of the wax modified with a pentaerythritol ester was prepared in a paste form in the following manner.

Twenty parts of paraffin, 5 parts of beeswax, 10 parts of carnauba wax, and 12 parts of montan wax were melted together and thoroughly mixed at a temperature of 130° C. When they were thoroughly mixed, the temperature was held at this figure while 5 parts of pentaerythritol ester of N wood resin were added. This material was then cut with 40 parts of turpentine. The resulting paste was excellent for use as a wood, furniture or floor polish.

*Example 36*

An emulsion of the new coating material of wax modified with a pentaerythritol ester was prepared in the form of a paste in the following manner.

Twenty-five parts of carnauba wax, 5 parts of pentaerythritol ester of N wood rosin, 15 parts of beeswax, 15 parts of ceresin wax, 8 parts of stearic acid, and 4.3 parts of triethanolamine were melted together at about 100° C. When these ingredients were thoroughly mixed, they were cut with 26 parts of turpentine. The turpentine solution was slowly diluted with 24 parts of naphtha. The temperature of this solution was held at 90° C. while 65 parts of water, also at 90° C., were added.

*Example 37*

An emulsion of the new coating material of wax modified with a pentaerythritol ester was prepared in liquid form in the same manner described in Example 36. The ingredients and their proportions were:

| | Parts |
|---|---|
| Carnauba wax | 8 |
| Pentaerythritol ester of N wood rosin | 2 |
| Beeswax | 4 |
| Ceresin wax | 4 |
| Naphtha | 80 |
| Stearic acid | 8 |
| Triethanolamine | 4.8 |
| Water | 200 |

These compositions in the form of emulsions and solutions made excellent polishers. They formed clear, bright, and very hard films which were extremely water-resistant. These films were found not to be as slippery as films formed by other wax polishes. Also, it was found they lasted much longer than other films and were much more resistant to wear.

The new, improved coating material can be prepared by modifying a wax with a rosin which has been esterified by a mixture of two or more members of the pentaerythritol group. The compositions in the following examples were prepared in the same manner as those in Examples 1–29. Here the modification was accomplished by a rosin ester of a mixture of 25% pentaerythritol+75% dipentaerythritol. Desirable compositions were produced by mixing this ester with wax in the proportions indicated in the following examples.

| | Example | |
|---|---|---|
| | 38 | 39 |
| High melting paraffin (M. P. 58.33° C.) | 80 | 97.5 |
| 25% pentaerythritol—75% dipentaerythritol ester of N wood rosin | 20 | 2.5 |

A wide range of ingredients may effectively be employed in place of those specifically designated in the examples. Any vegetable, insect, synthetic or mineral wax or waxy substance or mixture of these waxes or waxy substances may be used in place of the paraffin, beeswax, carnauba, candelilla, Japan, ozokerite, stearic acid or pentaerythritol stearate waxes used in the examples. Thus, in Example 1, in place of high melting paraffin, any of those waxes used in the later examples have been found suitable as have montan, ceresin, Chinese insect, opal (a hydrogenated castor oil product), and bayberry waxes, cetyl alcohol, and the like. In place of the pentaerythritol and dipentaerythritol esters of N wood rosin which were used in the examples, an ester of any of the pentaerythritols with rosin may be used. Thus, I may use an ester of pentaerythritol, dipentaerythritol, tripentaerythritol, or tetrapentaerythritol with either wood rosin or gum rosin. The rosin may be either in the crude form or in a form obtained by refining. The refining may have been accomplished by distillation, by extraction with selective solvents for color bodies, by heat treatment at 250°–350° C. for 0.5 to 3 hours, by hydrogenation or dehydrogenation, or both, brought about, for example, by heating with a platinum, palladium, or nickel hydrogenation catalyst either in the presence or in the absence of hydrogen, by subjecting to reaction with 1–9% by weight of the rosin of maleic anhydride, or by combinations of these treatments. The ester of the rosin may be an ester of a mixture of two or more members of the pentaerythritol group. Particularly good results were obtained when the esterification was accomplished with a mixture of pentaerythritol containing 15–50% of dipentaerythritol.

Satisfactory results have been obtained in a modified wax where as high as 25% of the weight of the non-volatile content was made up by the rosin pentaerythritol ester. In general, the most satisfactory compositions have an amount of modifier which constitutes from 1–10% of the total weight of the non-volatile constituents. The addition of pentaerythritol esters of rosin to a wax will improve the wax no matter how small an amount is added but it is usually found desirable to add an amount equal to at least 1% by weight of all the non-volatile constituents of the final product.

The modification of the wax may be accomplished by adding the rosin ester in conjunction with another modifier such as a cellulose ether. As observed in Examples 30–33, particularly good results were obtained when the rosin ester was used in conjunction with benzyl cellulose or ethyl cellulose. The cellulose ether toughens the composition, raises the melting point, and raises the viscosity of melts and solutions. It may be used in a quantity between about 1% and about 24% of the non-volatile content.

The modified wax compositions according to this invention are well adapted for use as coating or impregnating materials as the modification produces hardened waxes with only moderate changes in melting point. The impregnation is best accomplished by using the composition in a molten state. Paper and paper-board stock so impregnated were water-resistant. Other substrata on which this coating material was used to excellent advantages were cloth, regenerated cellulose foil, casein, methyl cellulose, and transparent sheeting produced from cellulose acetate. Compositions of the type illustrated by Examples 1–33, 38 and 39 are usually used for impregnation by the hot melt method.

As illustrated in Examples 34–37, this product is easily produced in the form of an emulsion, or solution. In these forms, the composition is particularly well adapted for use as a coating material. When a thick coating is desired, the composition will be used in the molten form, but where a light film is desired as in auto polishes, floor coatings, and linoleum surfacers, it may best be used in a paste, solution, or emulsion form.

Although naphtha and turpentine were used as the solvents in Examples 34 and 35, any one of a wide range of solvents may be used. Toluene, carbon tetrachloride, vinsol, ceresin, benzene, and xylene were found excellent.

The use of this modified wax as a polish is particularly satisfactory as it forms bright films which tend to be self-polishing and which are clear and water-resistant. These films are of superior harness and consequently, are longer wearing, and more scuff-proof than the films of waxes with the usual resin modifiers.

It is usually possible in compositions in accordance with this invention to add larger amounts of modifiers and thus to obtain harder waxes than have been possible with previous modifiers. Attempts to produce waxes of a hardness equal to that achieved in this invention usually yielded products which were somewhat milky in appearance, which were filled with air holes, or which were not of an even consistency. This invention makes possible a wax of improved hardness which is clear in color, is free of air holes, and is of an even consistency. In addition, this new modified wax is tough, flexible, and resistant to weathering and severe changes in climatic conditions.

What I claim and desire to protect by Letters Patent is:

1. An improved waxy coating and impregnating composition comprising a waxy substance and an ester of a pentaerythritol selected from the group consisting of pentaerythritol, dipentaerythritol, tripentaerythritol, and tetrapentaerythritol with rosin, as a modifier for the waxy substance, at least about 75% by weight of the total content of non-volatile components in the final composition consisting of the said waxy substance.

2. An improved waxy coating and impregnating composition comprising a waxy substance and a pentaerythritol ester of wood rosin, as a modifier for the waxy substance, at least about 75% by weight of the total content of non-volatile components in the final composition consisting of the said waxy substance.

3. An improved waxy coating and impregnating composition comprising a waxy substance and a dipentaerythritol ester of wood rosin, as a modifier for the waxy substance, at least about 75% by weight of the total content of non-volatile components in the final composition consisting of the said waxy substance.

4. An improved waxy coating and impregnating material comprising a waxy substance and an ester of a pentaerythritol selected from the group consisting of pentaerythritol, dipentaerythritol, tripentaerythritol, and tetrapentaerythritol with rosin, as a modifier for the waxy substance, the waxy substance comprising not less than 90% by weight of the non-volatile content of the final composition and the pentaerythritol rosin acid ester comprising not more than ten per cent of the non-volatile content of the final composition.

5. An improved waxy coating and impregnating material comprising a mixture of at least two waxy substances and an ester of a pentaerythritol selected from the group consisting of pentaerythritol, dipentaerythritol, tripentaerythritol, and tetrapentaerythritol with rosin, as a modifier for the waxy substances, not less than about 75% by weight of the total content of the non-volatile components in the final composition consisting of the said waxy substances.

6. An improved waxy coating and impregnating composition comprising beeswax and an ester of a pentaerythritol selected from the group consisting of pentaerythritol, dipentaerythritol, tripentaerythritol, and tetrapentaerythritol with rosin, as a modifier for the beeswax, the beeswax comprising at least about 75% by weight of the total content of non-volatile components in the final composition.

7. An improved waxy coating and impregnating composition comprising carnauba wax and an ester of a pentaerythritol selected from the group consisting of pentaerythritol, dipentaerythritol, tripentaerythritol, and tetrapentaerythritol with rosin, as a modifier for the carnauba wax, the carnauba wax comprising at least about 75% by weight of the total content of non-volatile components in the final composition.

8. An improved waxy coating and impregnating composition comprising paraffin and an ester of a pentaerythritol selected from the group consisting of pentaerythritol, dipentaerythritol, tripentaerythritol, and tetrapentaerythritol with rosin, as a modifier for the paraffin, the paraffin comprising at least about 75% by weight of the total content of non-volatile components in the final composition.

9. An improved coating and impregnating composition in the form of a paste comprising a wax modified with a pentaerythritol ester of rosin, and a solvent in such an amount that the non-volatile content is between 30% and 70% by weight, the composition of the paste being such that above about 75% by weight of its non-volatile constituents is wax.

10. An improved coating solution comprising a wax modified with a pentaerythritol ester of rosin, dissolved in a mixture of naphtha and turpentine, the composition of the solution being such that above about 75% by weight of its non-volatile constituents is wax.

11. An improved coating and impregnating emulsion comprising a wax modified with a pentaerythritol ester of rosin emulsified in water, the composition of the emulsion being such that above about 75% by weight of its non-volatile constituents is wax.

12. An improved waxy coating and impregnating composition comprising a large amount of a waxy substance, a small amount of a compatible cellulose ether selected from the group consisting of ethyl and benzyl ethers of cellulose and a small amount of an ester of a pentaerythritol selected from the group consisting of pentaerythritol, dipentaerythritol, tripentaerythitol, and tetrapentaerythritol with rosin, said rosin ester serving as a modifier for the original waxy substance, at least about 75% by weight of the total content of non-volatile components in the final composition consisting of the said waxy substance.

13. An improved waxy coating and impregnating composition comprising a waxy substance, a compatible cellulose ether selected from the group consisting of ethyl and benzyl ethers of cellulose and an ester of a pentaerythritol selected from the group consisting of pentaerythritol, dipentaerythritol, tripentaerythritol, and tetrapentaerythritol with rosin, as a modifier for the waxy substance, at least about 75% by weight of the total content of non-volatile components in the final composition consisting of the said waxy substance and not more than 15% by weight of the content of non-volatile components comprising cellulose ether.

14. An improved waxy coating and impregnating composition whose non-volatile constituents comprise 75% wax, 20% pentaerythritol rosin ester, and 5% ethyl cellulose.

ARTHUR H. SANFORD.